June 16, 1936.  J. V. GIESLER ET AL  2,044,427
ELECTROTHERMALLY OPERATED VALVE
Filed Aug. 3, 1932  3 Sheets-Sheet 1
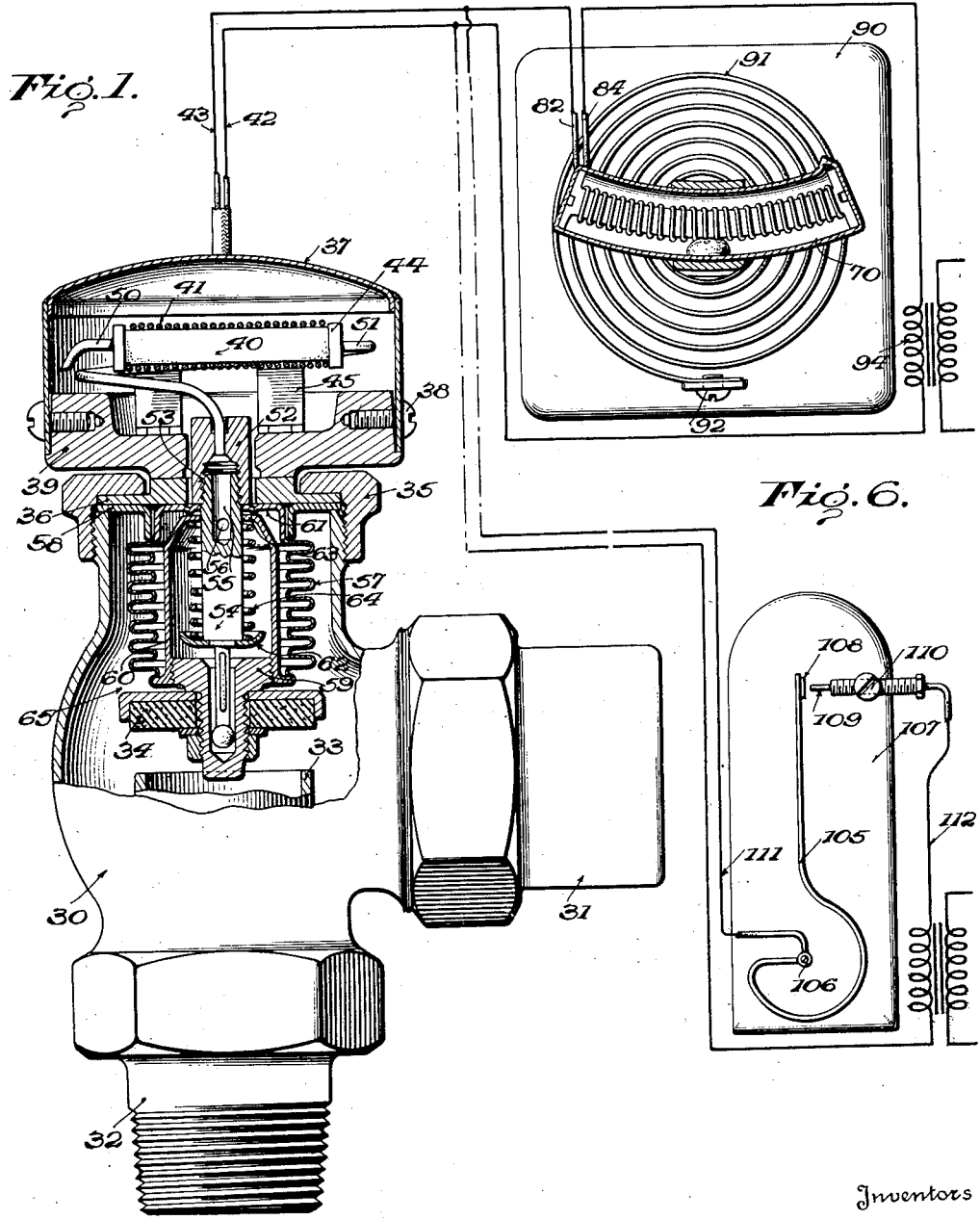
Inventors
Jean V. Giesler
William B. Mackintosh
By Cameron, Kerkam & Sutton
Attorneys June 16, 1936. J. V. GIESLER ET AL 2,044,427
ELECTROTHERMALLY OPERATED VALVE
Filed Aug. 3, 1932 3 Sheets-Sheet 2

Inventors
Jean V. Giesler
William B. Mackintosh
By Cameron, Kerkam & Sutton.
Attorneys

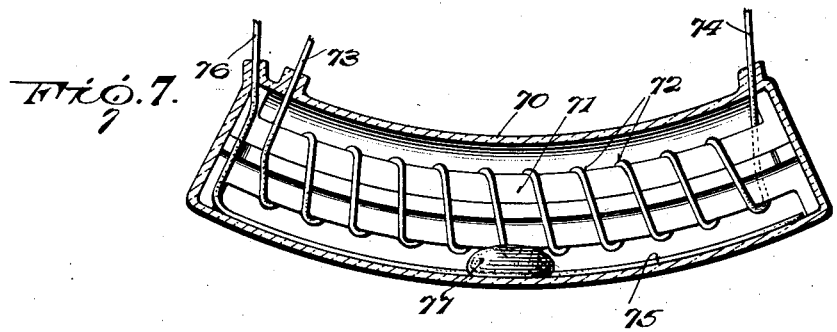
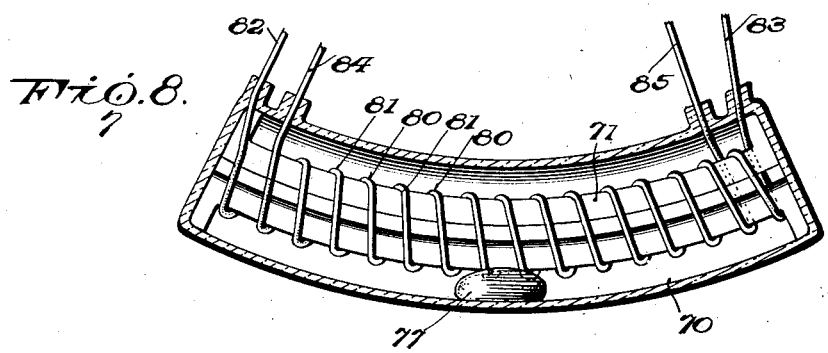
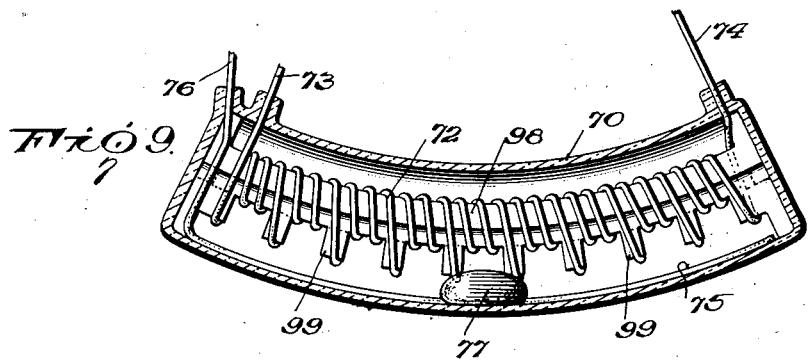

Patented June 16, 1936

2,044,427

UNITED STATES PATENT OFFICE 2,044,427

ELECTROTHERMALLY OPERATED VALVE

Jean V. Giesler and William B. Mackintosh, Knoxville, Tenn., assignors to The Fulton Sylphon Company, Knoxville, Tenn., a corporation of Delaware Application August 3, 1932, Serial No. 627,358

21 Claims. (Cl. 236—68)

This invention relates to electrically-controlled pressure-operated devices, and particularly to devices of that character for controlling the flow of a heating medium, such as steam, as for example in house heating radiators. Therefore the invention will be exemplified as embodied in an electrically-controlled valve, preferably a modulating valve, applied to any suitable radiator, although in some of its broader aspects the invention is capable of wider application.

It has heretofore been proposed to operate valves, dampers and the like by an electrothermally-operated motor element wherein a heating chamber has associated therewith an electric heating coil that is energized as the result of changes of condition in the medium which constitutes the source of control. Thus it has been proposed to provide an electrothermally-operated motor including an expansible and collapsible chamber and an electric heating coil, said chamber being charged with a suitable volatile fluid whereby the heating coil may volatilize said fluid and, by increase of vapor pressure in said expansible and collapsible chamber, cause expansion of said chamber to actuate the means to be controlled. In such a construction all of the energy required to move the means to be controlled must be derived from the electrical energy. This not only involves the consumption of considerable quantities of electrical energy, but it necessarily involves a considerable time lag in order to derive from the electrical energy a sufficient increase of thermodynamic energy from volatilization of said liquid and increase of vapor pressure to effect the volumetric as well as the pressure changes required to expand said chamber and operate said means to be controlled.

It is an object of this invention to provide a device of the character referred to which has a minimum of time lag and which is also economical in its use of electric current.

Another object of this invention is to provide a valve having an electrothermally-operated motor element for controlling the flow of a heating medium wherein a substantial part of the energy required to operate said valve is derived from the heated medium, thereby effecting a material saving in the amount of electric current consumed and imposing on the heating coil little more than the function of a relay to determine the pressure that shall exist in the motor.

Another object of this invention is to provide an electrothermally-operated motor having a heating chamber and an expansible and collapsible chamber in communication therewith and operatively connected to the means to be controlled, wherein the heating chamber contains but a relatively small volume of volatile liquid so that the delay incident to the development of the required vapor pressure will be reduced to a minimum, thereby both increasing the sensitivity and decreasing the time lag of the electrothermally-operated motor.

Another object of this invention is to provide an electrothermally-operated motor for operating a radiator valve or the like wherein much of the energy required for effecting the operation of the motor is derived from the heated medium to be controlled and wherein the sensitivity of the device is increased, and the time lag decreased, by subjecting only a relatively small volume of the thermosensitive fluid to the heating effect of an electric coil.

Another object of this invention is to provide an electrothermally-operated valve or the like which is highly sensitive and quickly responsive to temperature fluctuations; and also one which is relatively economical in its use of electric current.

Another object of this invention is to provide an electrothermally-operated valve or the like which is capable of accurately and economically maintaining a substantially uniform temperature because of its avoidance of the considerable temperature fluctuations which have been incident to the use of devices of this character as heretofore proposed.

Another object of this invention is to provide an electrothermally-operated valve or the like wherein the electric heating element is sensitively and accurately responsive to fluctuations in temperature in the controlling medium. Various forms of variable resistances have heretofore been proposed for controlling the flow of electric current through a heating coil. Carbon pile rheostats have been found to be somewhat erratic in operation as the resistance value for a given setting tends to change with the lapse of time, while considerable power is required for their effective operation. Rheostats and potentiometers using slidable contacts are also open to more or less serious objections, inasmuch as they not only tend to wear with continued use but the friction between the relatively movable contact elements tends to introduce an objectionable time lag, particularly if there is sufficient pressure between the contacting elements to assure a positive contact. Not only must considerable force be exerted upon the movable contact to overcome the starting friction, but this friction tends to vary with lapse of time, because of the accumulation of dust, oxides or other foreign substances on the contact surfaces. If the sensitivity and responsiveness of the electrothermally-operated motor are to be fully taken advantage of, the control circuit should be at least equally sensitive and responsive, and therefore it is the object of this invention to take full advantage of the sensitiveness and responsiveness of the electrothermally-operated motor of the present invention by combining therewith an electric control of the heating coil that is highly sensitive and accurately responsive.

Another object of this invention is to provide an electrothermally-operated motor with a heating coil and means for varying the operation thereof which is uniformly and promptly responsive to changes in the condition of the controlling medium.

Another object of this invention is to provide an electrothermally-operated motor with an electrically controlled heating coil wherein a continuously operating coil is sensitively and accurately responsive to progressive changes in the temperature of the controlling medium.

Another object of this invention is to provide an electrothermally-controlled motor with a heating coil which may operate intermittently or in a step by step manner but wherein the control of the heating coil is sensitive and accurate in its response to the predetermined conditions of its actuation.

Another object of this invention is to provide a modulating radiator valve with an electrothermally-controlled motor wherein the heating coil is progressively energized by means promptly, accurately and sensitively responsive to changes of temperature, to the end that a substantially uniform temperature may be maintained.

Another object of this invention is to provide a device of the type just characterized which is relatively simple in construction and rugged in use, as well as economical in operation.

Other objects of the invention will appear as the description of the invention proceeds.

Stated broadly the electrothermally-operated control of the present invention includes an expansible and collapsible vessel which is subjected to a heated medium, such as steam or any other suitable heated medium. Communicating with said expansible and collapsible vessel is a heating chamber of relatively small volume and containing a volatile liquid the vapor of which normally fills the expansible and collapsible vessel. Said heating chamber is subjected to the control of an electric heating element. Said volatile liquid is so selected that its boiling point is not higher, but preferably somewhat lower, than the normal temperature of said heated medium. Therefore, the expansible and collapsible vessel, because it is subjected to the temperature of said heated medium, is filled only with the vapor of said volatile liquid. As the amount of liquid in the heating chamber is relatively small, there is no large volume of liquid that must first be heated by the heating coil in order to raise the vapor pressure, and therefore the liquid in the heating chamber is sensitively responsive to the action of the heating coil. As the heating chamber is in open communication with the expansible and collapsible vessel the pressure is substantially uniform throughout this open system, and any increase in pressure in the heating chamber under the action of the heating coil is therefore accompanied by an increase in pressure in the vapor in the expansible and collapsible chamber. Any increase of pressure in the heating chamber is also accompanied by some transfer of the volatile fluid from the heating chamber to the expansible and collapsible vessel, and this is particularly the case when said vessel expands and therefore increases its volume in order to actuate the mechanism connected thereto. But whereas the heating coil is the source of energy for effecting the increase in pressure in the heating chamber and the transfer of a portion of said fluid to the expansible and collapsible vessel, the heated medium surrounding the latter is the source of a large part of the heat and energy by which work is done by the expansion of said vessel. Hence the heated medium, which is more difficult to control, may be controlled by means which derives a substantial part of its energy from this heated medium but which means may be sensitively controlled with a minimum of time lag from a more easily controlled electric circuit while using the electric current economically.

While the invention as so far characterized may be used with means for making and breaking or intermittently actuating the circuit through the heating coil, or with means heretofore known for varying the current through a heating coil, the present invention in its preferred embodiment, and to take full advantage of the sensitiveness and responsiveness of the electrothermally-operated motor heretofore characterized, also includes means which normally maintains a slight though continuous flow of electric current through the heating coil and which is sensitively and accurately responsive to small fluctuations of temperature by using a variable resistance in circuit with said coil which avoids fluctuating characteristics, impositive connections, time lags, variations in frictional opposition to relative movement, etc.

The invention is capable of receiving a variety of expressions, some of which are shown on the accompanying drawings, while certain features thereof can be used without other features thereof; therefore the drawings are to be considered as for purposes of illustration only, and not as a definition of the limits of the invention, reference being had to the appended claims for that purpose.

Referring to the drawings, wherein like reference characters indicate corresponding parts in the several figures, Fig. 1 shows an elevation, partly in section, of a modulated radiator valve embodying the present invention;

Fig. 6 illustrates the use of a make and break electric control for the heating coil in the embodiment of Fig. 1; and Figs. 7, 8 and 9 are axial sections of variable resistances embodying the present invention.

Figure 5:
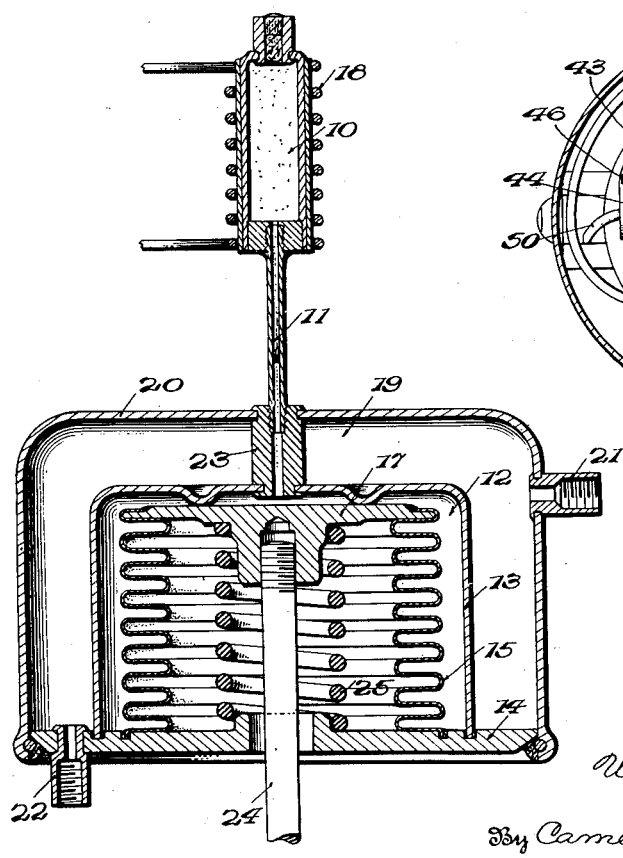
Fig. 5 is a somewhat schematic view to illustrate the principle of the electrothermally-operated motor of the present invention.

First referring to Fig. 5, the electrothermally-operated motor is composed of a relatively small heating chamber 10, of any suitable form, construction and material, in communication through a pipe or conduit 11, which may be rigid or flexible and of any suitable length and diameter, with an expansible and collapsible vessel 12, here shown as composed of a relatively rigid cup-shaped outer wall 13 brazed or otherwise suitably secured at its open end to a base plate 14 and containing an axially flexible wall in the form of a relatively thin deeply corrugated tubular wall or bellows 15 brazed or otherwise suitably secured at one end to the base plate 14 and at its opposite end to a relatively rigid movable end wall 17. The heating chamber 10 is shown as surrounded by a heating coil 18 of any suitable form and character and in circuit with any suitable means for making and breaking the circuit or varying the amount of current flowing through said coil. Surrounding the expansible and collapsible vessel 12 is a heating chamber 19 therefor, also shown as formed as a generally cup-shaped wall 20 suitably secured at its open end to the periphery of the base plate 14. The interior of said chamber 19 is supplied with a heated medium through pipe 21, and egress for said heated medium or its condensate is provided by the pipe 22. The walls 13 and 20 are shown as spaced and connected by a thimble 23 which has an aperture extending therethrough and which may form a part of the communicating piping between the chambers 10 and 12. End wall 17 is shown as connected to a post or rod 24, which may be connected to any suitable means to be controlled, and a coil spring 25 is interposed between the movable end wall 17 and the base plate 14 to predetermine the pressure which must exist in the chamber 12 before the end wall 17 may start to move to operate the rod or post 24.

The chamber 10 is charged with a volatile fluid whose boiling point is not higher than, but is preferably somewhat lower than, the temperature normally maintained in the chamber 19 by the heated medium flowing thereinto or therethrough. Therefore, all of the volatile fluid existing in the vessel 12, is in the form of a vapor, and this vapor completely fills said chamber in its normally contracted condition and held by the spring 25. The charge of volatile fluid, however, is preferably of such size that the chamber 10 is filled with the unvolatilized liquid, and it is also preferable that the major part of if not the entire communicating piping 11 be filled with said volatile fluid in its liquid form. The pressure existing in the vapor in the vessel 12 determines the pressure existing in the open system composed of the heating chamber 10, piping 11 and expansible and collapsible vessel 12, but the heating chamber 10 being cooler than the expansible and collapsible vessel 12, the volatile fluid in said chamber, and also in the major part of the piping 11, is in liquid form.

Assume now that the temperature of the coil 10 is increased. The heat delivered thereby will result in an increase of pressure in the chamber 10, with a concomitant change of pressure throughout the open system, and there will also be some volumetric expansion of the liquid in the chamber 10 with the consequent flow of fluid therefrom into the vessel 12. But the heat for volatilizing this transferred liquid is derived from the chamber 19. When the pressure within the system reaches a magnitude sufficient to overcome the tension of the spring 25, vessel 12 may begin to expand, with a further transfer of fluid from the chamber 10, but again a large part of the heat required to perform the work incident to volumetric expansion of the vessel 12 is derived from the fluid in the chamber 19. Hence the coil 18 furnishes the heat necessary for determining the pressure that shall exist in the system and for effecting the transfer of small amounts of liquid to the vessel 12 for performing the requisite work. As the volume of liquid in the chamber 10 is relatively small, and can in fact be made but a small fraction of the volume of liquid that has heretofore been used in electrothermally-operated motor elements, the liquid in said chamber 10 will quickly reach the temperature determined by the current flow through the heating coil 18, and as the energy for doing the work in the vessel 12 is largely derived from the chamber 19, there is little delay in the response while the current is used economically in the heating coil. Hence the electrothermally-operated motor of the present invention quickly and sensitively responds with an economical consumption of electric energy to effect the desired actuation of the rod 25.

It is to be expressly understood that the relative volumes of the chambers 10 and 12 shown in Fig. 5 are not essential, as this figure has been drawn for purposes of illustration rather than for purposes of showing dimensions and volumes. The chamber 10 may be, and preferably is, made as small as possible within the limitations imposed by the principle of operation just described. The volume of the heating chamber 10 must be sufficient so that when the expansible and collapsible vessel 12 is expanded to its limit, the vapor derived from the volatile liquid in said chamber will completely fill the system of chamber 10 and vessel 12 under the existing pressure.

The work done in the chamber 10 is therefore that required to move the liquid to the vessel 12 under the existing pressures, and is therefore proportional to the pressure change and the change of volume of the liquid in the chamber 10. The work done in the vessel 12 is also proportional to the pressure and volume changes, but the pressure change in the two chambers is substantially the same while there is a very substantial increase in volume in the vessel 12. In other words, for each unit volume of liquid forced out of the chamber 10 a much larger volume of vapor is formed in the vessel 12, and thus the ratio of work done in the vessel 12 may be many times that done in the chamber 10, depending upon the ratio of the volume of a given mass of the charging fluid when in the form of vapor at an average pressure to the volume of an equal mass of said fluid when in liquid form. Additionally, the use of the heated fluid in the chamber 19 for effecting a substantial part of the work to be done not only means a saving in the electric current used in the heating coil but by reason of the use of less current, a more compact and sensitive control for the heating coil may be provided that will assure both sensitivity and long life.

Figure 2:
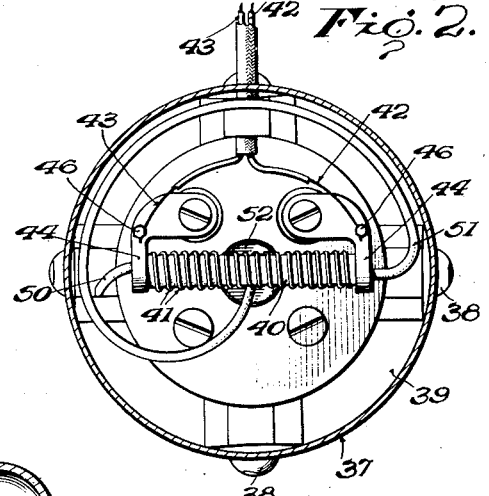
Fig. 2 is a horizontal cross section through the top chamber of the valve unit.

Referring now to Figs. 1 and 2, a construction is illustrated embodying the principles above explained. Any suitable valve casing 30, provided with inlet and outlet connections 31 and 32, has therein a suitable valve seat 33 with which is designed to cooperate a valve disk 34 of any suitable construction. Mounted on the top of the casing 30 and secured thereto in any suitable way, as by the ring nut 35 engaging the flange 36, is a housing 37 for the heating chamber and heating coil. As shown said housing is composed of a cup-shaped wall suitably secured as by screws 38 to an apertured base plate 39 which is formed with or suitably secured to the flange member 36. Mounted within the housing 37 is a heating chamber 40 shown as surrounded by and suitably insulated from a heating coil 41 having leads 42 and 43 extending to the outside of said housing. For convenience in mounting and completing the electrical connections the heating chamber is made as a tube and mounted in position, adjacent each end thereof, by spring clips 44 carried by insulating or insulated posts 45 secured to the plate 39. The electrical leads 42 and 43 extend to suitable binding posts 46 on said clips, as shown in Fig. 2, and therefore the electrical connections are completed, as well as the heating chamber mounted in position, by merely forcing the same into retaining engagement with said clips.

Adjacent one end the heating chamber 40 is provided with a filling tube 50 which may be sealed in any suitable way after the charge has been introduced into said chamber, and leading from the opposite end of said heating chamber is a pipe 51, which may be rigid or flexible and of any suitable length and size, and which extends down to and is secured in the end of a coupling nut 52. Nut 52 is threadedly attached at 53 to a post 54 suitably secured to and projecting upwardly from the valve member or its associated parts and also having a recess 55 which constitutes a continuation of the conduit 51, said recess having lateral apertures 56 communicating with the interior of the expansible and collapsible vessel next to be described.

The expansible and collapsible vessel is formed by a relatively thin deeply corrugated tubular wall or bellows 57 suitably secured at one end, as by brazing, to a flange 58 whereby it may be clamped in fluid-tight engagement with the wall of the valve housing 30, as by the ring nut 35. The opposite end of the bellows 57 is suitably secured, as by brazing, to the valve disk 34 or, as shown, to a threaded collar 59 suitably secured thereto. Collar 59 is threaded at its periphery and has mounted thereon by means of said threads a tubular stop 60 which, by engagement with a flange or shoulder 61 formed on or suitably secured to the post 54, determines the extent to which the bellows 57 may be collapsed in providing a wide open position for the valve disk 34. Mounted on the post 54 is also a spring abutment 62 and disposed between said abutment and the closed end wall 63 of the tubular stop 60 is a coil spring 64 which predetermines the pressure which must exist in the expansible and collapsible vessel before the latter may expand and move the valve disk 34 toward closed position. The end wall of the tubular stop 60 closely surrounds the post 54 and slides thereon to guide and maintain rectilinear the expansible and collapsible movements of the bellows 57 and therefore the movements of the valve disk 34.

The expansible and collapsible vessel thus defined by the bellows 54 is disposed within a chamber 65 which is normally filled with the steam flowing through the valve casing 30. The volatile fluid charge in the electrothermally-operated motor in this case should have a boiling point slightly below the normal temperature of the steam, and for example may be methyl alcohol or acetone, and the volume of volatile fluid introduced into the open system composed of the heating chamber 40, pipe 51 and expansible and collapsible vessel 57 is preferably such as to fill the heating chamber 40 and pipe 51, while the expansible and collapsible vessel 57 is filled with the vapor of said fluid, when said vessel is in its most contracted position and the valve 34 is most remote from its seat under the action of the spring 64. The spring 64 is of such strength that the vapor pressure existing in the chamber 57 is insufficient to overcome its tension prior to a predetermined application of heat to the heating coil 41.

Heating coil 41 may be energized in any suitable way, but in accordance with the preferred use of the present invention the control of said heating coil is such as to take full advantage of the sensitiveness and responsiveness of the electrothermally-operated motor element as heretofore described. Therefore the regulation of the current flowing through the coil 41 is preferably effected by means which is not subject to variations of operation and resistance to adjustment such as are characteristic of the use of carbon pile rheostats and sliding contact rheostats, although as will be apparent from the foregoing some of the advantages of the present invention would be obtained by controlling the heating coil 41 by means of such known rheostats.

Preferably the control of the current flowing through the coil 41 is effected by a variable resistance of the type which may best be understood by referring to Figs. 7 and 8. This variable resistance device is composed of a tubular casing 70 of electrically insulating material such as glass, and preferably of arcuate form, and containing a bobbin 71 of suitable electrically insulating material such as porcelain, which may be grooved if desired to receive the resistance element. Coiled around said bobbin 71 is a wire 72 of suitable resistance material, such as nichrome, said wire having leads 73 and 74 projecting from the casing. Suitably mounted on or affixed to the interior wall of the casing 70 is a second conductor or wire 75, which may also be of the same resistance material, having a lead 76 projecting from the casing. Mounted within the casing is a globule of mercury 77 of sufficient size so that it will bridge the space between the wires 72 and 75 and form a good electric contact with both. Casing 70 and its bobbin 71 have a common curvature, and the casing 70 may be filled with a neutral or inactive gas, such as nitrogen. The casing 70 is designed to be mounted for oscillation about a center which may be coincident with its center of curvature, and as the casing 70 is tilted in one direction or the other of globule of mercury 77 will move by gravity along the wire 75 and include more or less of the wire 72 in the circuit, depending upon the direction in which the tube 70 is tilted and which of the leads 73 or 74 is connected in circuit with the lead 76—the two leads 73 and 74 being provided so that the device can be connected to increase the resistance in the circuit by tilting the tube in either one or the other direction, depending upon the exigencies of the installation. On the other hand, by suitably connecting both of the leads 73 and 74 into the circuit, the structure of Fig. 7 constitutes a potentiometer.

It will therefore be perceived that the variable resistance so provided obviates the changes of characteristic and the need for overcoming considerable resistance to movement characteristic of carbon pile rheostats, while it avoids the need for overcoming starting friction between relatively movable contacts, eliminates the difficulties heretofore encountered with impositive connections between said contacts, and avoids the difficulties heretofore experienced with accumulation of dirt, oxides, etc., between the contacts characteristic of sliding contact rheostats, while it assures that the resistance to operation and action of the device shall be uniform from one extremity to the other of its range of movement.

In place of providing a wire 75 along the wall of the variable resistance device as shown in Fig. 7, the bobbin 71 may be wrapped with two parallel resistance conductors 80 and 81, the former having leads 82 and 83 projecting to the exterior of the casing, and the latter having leads 84 and 85 projecting to the exterior of the casing. In this construction the parallel wires are spaced sufficiently far apart to assure that there will be no short circuiting, while the globule of mercury 77 should be of sufficient size to assure that it will always bridge the space between any two wires of said parallel windings. Otherwise, the construction and operation of this device are the same as that shown in Fig. 7.

Figure 3:
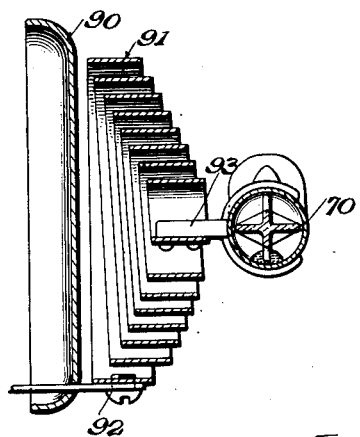
Fig. 3 is an axial section through a thermostatically controlled varying resistance.
Figure 4:
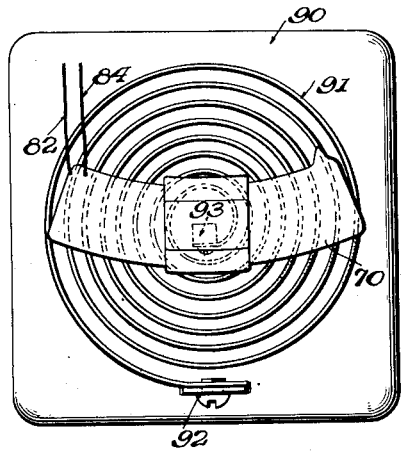
Fig. 4 is a front view of the thermostatically controlled varying resistance of Fig. 3.

With the foregoing explanation of the principle underlying the variable resistance which it is preferred to use in the present invention, reference may be had to Figs. 1, 3 and 4 as showing the complete installation. Mounted upon any suitable base plate 90 is a thermostat of any suitable construction, here shown as a bimetallic coil 91 suitably attached at one end to said base plate 90 at 92 and carrying at its opposite end a clamp 93 in which is received the casing 70 of a variable resistance device such as shown in Fig. 8. Lead 82 from said variable resistance device is connected to the lead 43 in the heating coil 41, while lead 84 from said variable resistance device is connected to lead 42 of said heating coil 41 through the low voltage secondary of an induction coil 94, the primary of which may be connected into any ordinary house lighting circuit.

The foregoing construction of variable resistance is designed to maintain a continuous current through the heating coil 41 when the device is in operation. Sometimes, however, it is desirable that the heating coil be energized only after predetermined increments of change have taken place. When this is desired a variable resistance of the form shown in Fig. 9 may be employed. In the form here shown the structure is similar to that above described in conjunction with Fig. 7 except that the bobbin 98 is provided at predetermined intervals with projections 99 and the resistance wire 72 is passed over each of said projections 99, and may or may not be wound around intermediate sections of the bobbin. The globule of mercury 77 is of sufficient size to bridge the wire 72 at two contiguous projections 99, but is not of sufficient size to bridge three contiguous projections 99. Hence the circuit through the heating coil is closed when said globule 77 is bridging the wire on two of said projections, as shown in Fig. 9, but as the casing 70 is thereafter tilted the globule of mercury will pass out of contact with the wire on one of said projections, and while remaining in contact with the wire on the second of said projections, there will be an interval during which the circuit is interrupted until the tilting of the casing 70 continues sufficiently to bring the globule 77 into bridging relation with the wire on the next of said projections.

Sometimes it is desirable to provide for only open and closed positions of the valve, in which event the heating coil 41 may have in circuit therewith any suitable make and break device. Referring to Fig. 6 a bimetallic thermostatic strip 105 is suitably mounted at 106 on a base plate 107 and carries at its end a contact 108 which may engage a contact 109 suitably mounted at 110 on said base plate. The leads 111 and 112 from said contacts 108 and 109 respectively may be connected to the leads 43 and 42 respectively of the heating coil 41 analogously as in the construction of Fig. 1.

The construction illustrated in Fig. 1 provides a modulating valve which is continuously under the control of the thermostatically operated variable resistance. To explain the operation, assume that the room is cold. The thermostat will then have moved the variable resistance from the position shown in Fig. 1 in a clockwise direction until the globule of mercury 77 is substantially at the right-hand end of the casing 70 as viewed in that figure, and therefore the resistance of both the windings 80 and 81 will be interposed in circuit with the heating coil 41. In this position the magnitude of the resistance may be such as to substantially stop the flow of current through the heating coil 41. The spring 64 is now holding the expansible and collapsible chamber 44 contracted, with its tubular stop 60 against the shoulder 61, and the valve disk 34 is therefore in its wide open position. Steam is therefore flowing through the valve housing 30 and surrounding the expansible and collapsible vessel 57, and said vessel is filled with the vapor of the volatile fluid but the tension of said vapor is insufficient to overcome the tension of the spring 64. The heating chamber 40, and also preferably the communicating piping 51, are now filled with the liquid of the volatile fluid.

As the temperature in the room rises the thermostat 91 moves the tube 70 of the variable resistance device in an anti-clockwise direction as viewed in Fig. 1, and therefore the globule of mercury travels relatively to the left, as viewed in said figure, under the influence of gravity to diminish the amount of resistance in circuit with the heating coil 41 and therefore permit an increased flow of current through the latter. Coil 41 therefore heats the heating chamber 40 and causes an expansion of the volatile liquid therein, forcing some of it into the expansible and collapsible vessel 57 where it is volatilized by the heat of the steam surrounding said chamber. As the temperature in the room continues to rise and the variable resistance device 70 is moved farther to the right as viewed in Fig. 1 the resistance in the heating coil circuit is cut down to such a point that the heat created by said coil causes the vapor pressure in the vessel 57 to exceed the resistance of the spring 64, and the chamber 57 therefore begins to expand under the principles heretofore described, moving the valve plate 34 toward its seat and cutting down on the flow of steam through the radiator. This will continue until a condition of equilibrium is reached.

If the room falls in temperature below that desired by reason of the throttling of the steam inlet, the variable resistance device is moved in the opposite direction, increasing the resistance and decreasing the current flowing through the coil 41. The heating chamber 40 therefore cools, owing to the dissemination of heat to the surrounding atmosphere, and the resulting vapor pressure in the chamber 57 is decreased, whereby the spring 64 correspondingly collapses the vessel 57 and moves the valve disk 34 to a more open position. In practice it has been found that the thermostat will so position the variable resistance device as to maintain such a vapor pressure in the vessel 57 that the valve disk permits the proper flow of steam to maintain a uniform temperature over long periods of time, while any change in the temperature of the room by reason of a change in exterior temperatures, the opening of doors or windows, etc., will result in a prompt and smooth readjustment of the position of the valve disk with respect to its seat so as to increase or decrease the steam flow suitably for compensating for the change in atmospheric conditions, eliminating the wide fluctuation, and also the characteristics of "hunting", characteristic of earlier devices.

If it is desired that the valve be operated step by step upon the occurrences of incremental changes of condition, the variable resistance of Fig. 9 may be employed, or if it is desired that the valve have only two positions, i. e. that it be either open or closed, a make and break device as in Fig. 6 may be employed.

It will therefore be perceived that an electrothermally-operated motor element has been provided which is highly sensitive and quickly responsive to temperature conditions at the heating coil because of the promptness with which the small volume of liquid in the heating chamber may respond to changes of heat produced by the coil, while the amount of energy required at the coil is materially reduced by utilizing the heat of the steam as a source of energy in aiding in the expansion of the expansible vessel. It will also be perceived that a variable resistance device has been provided which affords a highly sensitive and continuous control of the heating coil while eliminating the variations of operation and resistances to movement characteristic of the various forms of rheostat heretofore employed. Hence a modulating radiator valve has been provided which is accurately and sensitively responsive to small changes of temperature and which at the same time uses electric current economically, although it is constantly under the control of the thermostat. As the heat energy required from the coil is only such as is necessary to effect the expansion of the liquid in the chamber 10 under the existing pressure, the amount of current flowing through the coil is small, and therefore the device is economical, while the electrical controlling mechanism employed may be compact and highly sensitive because of the fact that the current to be controlled is relatively weak. This enables the maintenance of a continuous control of the valve from the electric circuit economically and thereby obtains the close regulation and modulating effect of a valve whose position is promptly and accurately adjusted by small increments in response to slight variations of temperature in the medium whose temperature is to be controlled. At the same time, if desired, the improved electrothermally-operated motor device can be controlled by a make and break device in the electric circuit or in a step by step manner, or with less efficient rheostats, while still obtaining many of the advantages of the present invention. It will also be apparent that the improved variable resistance device can also be used with other forms of electrothermally-operated motor devices and also that it is capable of a wide variety of other uses.

While the embodiments of the invention illustrated on the drawings have been described with considerable particularity, it is to be expressly understood that the invention is not restricted thereto, as the same is capable of receiving a variety of expressions within the principles heretofore disclosed, while changes may be made in the details, arrangement, proportion and sizes of parts, and certain features used without other features, without departing from the spirit of this invention. Reference is therefore to be had to the appended claims for a definition of the limits of the invention.

What is claimed is:

1. In a modulating radiator valve, in combination with a valve mechanism, an electrothermally-operated motor comprising an expansible and collapsible vessel operatively connected to said valve mechanism and subjected to the heat of the medium to be controlled, a heating chamber of small volume communicating with said vessel and charged with a volatile fluid whose boiling temperature is below the temperature of said heating medium, a heating coil associated with said heating chamber, and means to vary the current flow through said heating coil.

2. In a modulating radiator valve, in combination with a valve mechanism, an electrothermally-operated motor comprising an expansible and collapsible vessel operatively connected to said valve mechanism and subjected to the heat of the medium to be controlled, a heating chamber of small volume communicating with said vessel and charged with a volatile fluid whose boiling temperature is below the temperature of said heating medium, a heating coil associated with said heating chamber, and means to vary the current flow through said heating coil, said last named means including a variable resistance and thermostatic means for adjusting the magnitude of said resistance.

3. In a modulating radiator valve, in combination with a valve mechanism, an electrothermally-operated motor comprising an expansible and collapsible vessel operatively connected to said valve mechanism and subjected to the heat of the medium to be controlled, a heating chamber of small volume communicating with said vessel and charged with a volatile fluid whose boiling temperature is below the temperature of said heating medium, a heating coil associated with said heating chamber, means to vary the current flow through said heating coil, said last named means including a variable resistance adapted to maintain constantly a current through said heating coil, and means to progressively vary the magnitude of said current.

4. In a modulating radiator valve, in combination with a valve mechanism, an electrothermally-operated motor comprising an expansible and collapsible vessel operatively connected to said valve mechanism and subjected to the heat of the medium to be controlled, a heating chamber of small volume communicating with said vessel and charged with a volatile fluid whose boiling temperature is below the temperature of said heating medium, a heating coil associated with said heating chamber, means to vary the current flow through said heating coil, said last named means including a variable resistance adapted to maintain constantly a flow of current through said heating coil, and a thermostat operatively connected to said variable resistance to progressively vary the resistance of said device.

5. In a modulating radiator valve, in combination with a valve mechanism, an electrothermally-operated motor comprising an expansible and collapsible vessel operatively connected to said valve mechanism and subjected to the heat of the medium to be controlled, a heating chamber of small volume communicating with said vessel and charged with a volatile fluid whose boiling temperature is below the temperature of said heating medium, a heating coil associated with said heating chamber, and thermostatic means for predetermining the current flow through said heating coil.

6. In a modulating radiator valve, in combination with a valve mechanism, an electrothermally-operated motor for operating said valve mechanism and including an expansible and collapsible vessel operatively connected to said valve mechanism, means for subjecting said vessel to heat, a heating chamber of relatively small volume in communication with said vessel and charged with a volatile fluid whose boiling temperature is below the temperature at said vessel, a heating coil associated with said heating chamber, and means for varying the current flow through said coil.

7. In a modulating radiator valve, in combination with a valve mechanism, an electrothermally-operated motor element for operating said valve mechanism and including an expansible and collapsible vessel operatively connected to said valve mechanism, means for subjecting said vessel to heat, a heating chamber of relatively small volume in communication with said vessel and charged with a volatile fluid whose boiling temperature is below the temperature at said vessel, said charge being of such volume that said heating chamber is full of said volatile liquid when said expansible and collapsible vessel is in its most contracted condition, a heating coil associated with said heating chamber, and means for varying the current flow through said coil.

8. In an electrothermally-operated device, in combination with a member to be operated, an expansible and collapsible vessel operatively connected to said member, a heating chamber in communication with said vessel, a heating coil associated with said chamber, means for controlling the flow of current through said coil to heat said chamber, said heating chamber being of relatively small volume as compared with the volume of said vessel and being charged with a volatile liquid, and means for heating said vessel to a temperature which will maintain only vapor in said vessel.

9. In an electrothermally-operated device, in combination with a member to be operated, an expansible and collapsible vessel operatively connected to said member, a heating chamber in communication with said vessel, a heating coil associated with said chamber, means for controlling the flow of current through said coil to heat said chamber, said vessel and chamber being charged with a volatile fluid and said chamber being of such small volume that the ratio of the maximum volume of said vessel and chamber to the volume of said chamber is approximately equal to the ratio of the vapor volume to the liquid volume of a given mass of said volatile fluid, and means for subjecting the said vessel to a temperature which will maintain only vapor in said vessel.

10. In an electrothermally-operated device, in combination with a member to be operated, an expansible and collapsible vessel operatively connected to said member, a heating chamber in communication with said vessel, a heating coil associated with said chamber, means for controlling the flow of current through said coil to heat said chamber, said vessel and chamber being charged with a volatile fluid which, when said chamber is relatively cool, completely fills the same and said vessel having a volume which, when expanded, is substantially equal to the increase in volume of said liquid when vaporized, and means for subjecting said vessel to a temperature which will maintain only vapor in said vessel.

11. In an electrothermally-operated device, in combination with a member to be operated, an expansible and collapsible vessel operatively connected to said member, a heating chamber in communication with said vessel, a heating coil associated with said chamber, means for controlling the flow of current through said coil to heat said chamber, said chamber and vessel being charged with a volatile fluid, means for subjecting said vessel to a temperature which will maintain only vapor in said vessel, and means for subjecting said vessel to resilient pressure, said chamber being of such small volume that the volumetric change from liquid to vapor of a volume of liquid substantially equal to the volume of said chamber under the existing pressures is substantially equal to the change in volume of said vessel when expanded from its most contracted to its most expanded condition.

12. In an electrothermally-operated device, in combination with a member to be operated, an expansible and collapsible vessel operatively connected to said member, a heating chamber in communication with said vessel, a heating coil associated with said chamber, means for controlling the flow of current through said coil to heat said chamber, said chamber and vessel being charged with a volatile fluid, means for subjecting said vessel to a temperature that will maintain only vapor in said vessel, the volume of said chamber being so related to the volume of said fluid that when said chamber is relatively cool said chamber is substantially full of said liquid and said vessel contains only vapor and when said vessel is in its most expanded condition and said chamber is hot substantially the entire volume of said fluid is vapor.

13. In an electrothermally-operated device, in combination with a member to be operated, an expansible and collapsible vessel operatively connected to said member, a heating chamber in communication with said vessel, a heating coil associated with said chamber, means for controlling the flow of current through said coil to heat said chamber, said chamber and vessel being charged with a volatile vapor, and means for subjecting said vessel to a temperature such that said vessel normally contains only the vapor of said fluid, said chamber being of relatively small volume as compared with said vessel but providing sufficient of said volatile fluid that when vaporized it will expand said vessel to its most expanded condition.

14. A modulating valve comprising, in combination with valve mechanism, an expansible and collapsible vessel operatively connected to said valve mechanism, a relatively small heating chamber in communication with said vessel and charged with a volatile fluid, means for subjecting said vessel to a heated medium whose normal temperature is above the boiling point of said fluid, said chamber being of such small volume that the ratio of the maximum volume of said vessel and chamber to the volume of said chamber is approximately equal to the ratio of the vapor volume to the liquid volume of a given mass of said volatile fluid, a heating coil associated with said chamber, and means for controlling the current flowing through said heating coil.

15. A modulating valve comprising, in combination with valve mechanism, an expansible and collapsible vessel operatively connected to said valve mechanism, a relatively small heating chamber in communication with said vessel and charged with a volatile fluid, means for subjecting said vessel to a heated medium whose normal temperature is above the boiling point of said fluid, the volume of said chamber being so related to the volume of said fluid that when said chamber is relatively cool said chamber is substantially full of said liquid and said vessel contains only vapor and when said vessel is in its most expanded condition and said chamber is hot substantially the entire volume of said fluid is vapor, a heating coil associated with said chamber, and means for intermittently making and breaking the circuit through said heating coil.

16. A modulating valve comprising, in combination with valve mechanism, an expansible and collapsible vesssel operatively connected to said valve mechanism, a relatively small heating chamber in communication with said vessel and charged with a volatile fluid, means for subjecting said vessel to a heated medium whose normal temperature is above the boiling point of said fluid, a heating coil associated with said chamber, and means for progressively varying the circuit through said heating coil.

17. A modulating valve comprising, in combination with valve mechanism, an expansible and collapsible vessel operatively connected to said valve mechanism, a relatively small heating chamber in communication with said vessel and charged with a volatile fluid, means for subjecting said vessel to a heated medium whose normal temperature is above the boiling point of said fluid, a heating coil associated with said chamber, and means for controlling the current flowing through said heating coil including a thermostatically operated variable resistance.

18. A modulating valve comprising, in combination with valve mechanism, an expansible and collapsible vessel operatively connected to said valve mechanism, a heating chamber in communication with said vessel and charged with a volatile fluid, means for subjecting said vessel to a heated medium whose normal temperature is above the boiling point of said fluid, a heating coil associated with said chamber, and a thermostatically operated device for predetermining the operation of said heating coil.

19. A modulating valve for controlling a heated medium comprising, in combination with valve mechanism, an expansible and collapsible vessel operatively connected to said valve mechanism and subjected to the heat of said medium to be controlled, a relatively small heating chamber in communication with said vessel and charged with a volatile fluid whose boiling temperature is below the temperature of said heated medium, a heating coil associated with said heating chamber, and means to vary the flow of current through said heating coil.

20. A modulating valve for controlling a heated medium comprising, in combination with valve mechanism, an expansible and collapsible vessel operatively connected to said valve mechanism and subjected to the heat of said medium to be controlled, a relatively small heating chamber in communication with said vessel and charged with a volatile fluid whose boiling temperature is below the temperature of said heated medium, a heating coil associated with said heating chamber, and thermostatically controlled means for progressively varying the flow of current through said heating coil.

21. An electrically controlled modulating radiator valve comprising, in combination with valve mechanism, an expansible and collapsible vessel operatively connected with said valve mechanism and subjected to the heated medium to be controlled, a heating chamber in communication with said vessel, said chamber being charged with a volatile fluid whose boiling point is below the temperature of said heated medium, a heating coil associated with said heating chamber, and means to predetermine the heating effect of said coil, said chamber being relatively small and containing substantially only so much of said volatile liquid as is required to provide the vapor requisite to expand said vessel under the heat of said heated medium when said coil is heated to the requisite degree.

JEAN V. GIESLER.
WILLIAM B. MACKINTOSH.